(12) United States Patent
Huhtanen et al.

(10) Patent No.: US 12,006,628 B2
(45) Date of Patent: Jun. 11, 2024

(54) SYSTEM AND METHOD OF PRODUCING MICRO FIBRILLATED CELLULOSE (MFC)

(71) Applicant: Valmet Technologies Oy, Espoo (FI)

(72) Inventors: Juha-Pekka Huhtanen, Tampere (FI); Tuomo Aho, Tampere (FI)

(73) Assignee: VALMET TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/084,720

(22) Filed: Dec. 20, 2022

(65) Prior Publication Data

US 2023/0193558 A1 Jun. 22, 2023

(30) Foreign Application Priority Data

Dec. 22, 2021 (FI) ...................................... 20216320

(51) Int. Cl.
| | |
|---|---|
| D21F 1/00 | (2006.01) |
| D21F 1/80 | (2006.01) |
| D21F 3/04 | (2006.01) |
| D21F 3/08 | (2006.01) |
| D21F 9/00 | (2006.01) |
| D21G 9/00 | (2006.01) |
| D21H 11/18 | (2006.01) |

(52) U.S. Cl.
CPC .............. *D21F 1/0009* (2013.01); *D21F 1/80* (2013.01); *D21F 3/04* (2013.01); *D21F 3/08* (2013.01);
(Continued)

(58) Field of Classification Search
CPC . D21F 1/0009; D21F 1/80; D21F 3/04; D21F 3/08; D21F 9/003; D21G 9/0027;
(Continued)

(56) References Cited

U.S. PATENT DOCUMENTS

| 2021/0301470 A1* | 9/2021 | Huhtanen | .............. D21H 11/18 |
| 2023/0071986 A1* | 3/2023 | Aho | ........................ D21H 11/18 |

(Continued)

FOREIGN PATENT DOCUMENTS

| CN | 105229229 B | * | 9/2017 | ............. B02C 13/20 |
| CN | 116333338 A | * | 6/2023 | ............. C08B 15/08 |

(Continued)

OTHER PUBLICATIONS

Office Action from the Finnish Patent and Registration Office for FI 20216320 dated Jun. 29, 2022.

(Continued)

*Primary Examiner* — Jose A Fortuna
(74) *Attorney, Agent, or Firm* — Stiennon & Stiennon

(57) ABSTRACT

The invention relates to a system of producing MFC (micro fibrillated cellulose) having a process device (30) of a pulper, a refiner or a screen configured to process MFC suspension to consistency of 0.5-5%. The system has a continuous pressing means (15; 25, 26) configured to dry the MFC suspension to a consistency of 6-60%. A method of producing MFC has at least one process stage (30) which processes a MFC suspension to a consistency of 0.5-5% by a process device (30). In the process stage the MFC suspension is pulped in a pulping stage in a pulper and/or refined in a refining stage by a refiner and/or screened in a screening stage by a screen. The MFC suspension having the consistency of 0.5-5% is dried in a drying stage of continuous pressing (15, 25, 26) by continuous a pressing device (15, 25, 26) to a consistency of 6-60%.

7 Claims, 1 Drawing Sheet

(52) U.S. Cl.
CPC ............ *D21F 9/003* (2013.01); *D21G 9/0027* (2013.01); *D21H 11/18* (2013.01)

(58) Field of Classification Search
CPC ......... D21H 11/18; C08B 15/08; C08B 15/00; D21C 9/007; D21C 9/18; D21D 1/00; D21D 5/02; D21D 1/20; C08H 8/00; C08J 3/00; C08J 2301/00; B30B 9/02; D21B 1/345
See application file for complete search history.

(56) References Cited

U.S. PATENT DOCUMENTS

| | | | |
|---|---|---|---|
| 2023/0193558 A1* | 6/2023 | Huhtanen | ................ D21D 5/02 |
| | | | 162/189 |
| 2023/0204489 A1* | 6/2023 | Huhtanen | ................ C08B 1/00 |
| | | | 536/124 |

FOREIGN PATENT DOCUMENTS

| | | | |
|---|---|---|---|
| EP | 4151799 A2 * | 3/2023 | ............. D21C 9/007 |
| WO | 2014096547 A1 | 6/2014 | |
| WO | 2014106684 A1 | 7/2014 | |
| WO | 2015068019 A1 | 5/2015 | |
| WO | 2020160565 A1 | 8/2020 | |

OTHER PUBLICATIONS

Extended European Search Report for Application No. 2220869.0-1016 dated May 30, 2023.

Vappula, R. et al., Papermaking Science and Technology, Papermaking Part 1, Stock Preparation and Wet End, Finnish Paper Engineers' Association, p. 423, © 2007 by Paperi ja Puu Oy.

* cited by examiner

SYSTEM AND METHOD OF PRODUCING MICRO FIBRILLATED CELLULOSE (MFC)

CROSS REFERENCES TO RELATED APPLICATIONS

This application claims priority on FI 20216320, filed Dec. 22, 2021, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

In general, the present invention relates to producing of micro fibrillated cellulose (MFC). More specifically the present invention relates to a system of producing MFC.

Micro fibrillated cellulose (MFC) comprises very thin cellulose fibrils, the width of which is typically 10-100 nm and the length of which is typically between 0.5-10 μm. MFC also typically by definition includes nano fibrillated cellulose. MFC is typically processed of wood based cellulose fibrils but it can also be processed of other plant based, non-wood-based sources for example agricultural-based fibrils such as straw pulp, bagasse, bamboo and cotton or recycled cotton from textile recycling. MFC properties can be modified by producing different types of fines based on size and shape.

It is known from the prior art that in producing micro fibrillated cellulose the process comprises in the beginning pulping and refining stages. In refining the cellulose material is refined in a refiner to mechanically treat and modify fibrils thereof to provide desired properties to the cellulose material for production of selected MFC with required properties. Mechanical treatment can be improved by chemical and/or enzyme additions. Various technologies are used in connection with the production of MFC, for example Masuko grinder technology, disk refining technology, high consistency refining technology, homogenization technology, micro fluidization technology, extruding technology and disperser technology. Typically, MFC is produced with different types of refiners by recirculating material from the outlet to the inlet several times to achieve MFC with a desired particle size and size variation. The refining is conducted in low consistency, 3-5% of the MFC suspension. In some cases, there is a need to dewater, i.e., dry the MFC suspension to higher consistencies. Sometimes the refined MFC suspension is to be transported to another geographical location for further processing and then it is beneficial that the consistency of the MFC suspension be high in order to avoid transportation of water. Sometimes the MFC suspension is used in dry end applications of the fiber web production line and then it is beneficial that the consistency of the MFC suspension be high in order to avoid further drying needs. Sometimes the MFC suspension is used in applications for non-fiber web products, for example composite material products and then, it is beneficial that the consistency of the MFC suspension be high in order to avoid further drying needs. MFC material is very hydrophilic and thus hard to dry. It is known from the prior art to dry MFC suspension by oven drying i.e., by evaporation drying. In connection with MFC production it is also known to use freeze drying technology. A disadvantage of these drying technologies is that evaporation and freezing consume high amounts of energy and are also very time consuming. These are also batch-type drying processes. Additionally, the drying of the MFC suspension needs to be well controlled, as otherwise possible hornification, which destroys the quality of the MFC, may occur. Thus, MFC suspension is typically not more than up to 50% consistency to avoid the possible hornification. It is known from the prior art to dry a MFC suspension by hydraulic pressing, which is also a batch-type process, but this has low production rate per equipment.

An object of the invention is to create a system and method of producing MFC, in which the disadvantages and problems of the prior art are eliminated or at least minimized.

An object of the invention is to create an improved system and method of producing MFC, in which new, alternative, ways of producing MFC are provided, especially in view of drying a MFC material and more especially in view of energy consumption, drying time and/or transportation costs thereof.

A particular, non-binding, object of the invention is to create an improved system and method of producing MFC in view of further processing applications of dried MFC material.

A particular, non-binding, object of the invention is to create an improved system and method of producing MFC in view of controlling consistency of dried MFC material.

A particular, non-binding, object of the invention is to create an improved system and method of producing MFC in view of preserving fines in dried MFC material.

SUMMARY OF THE INVENTION

According to an advantageous aspect of the invention the MFC suspension having a consistency of 0.5-5% is dried by continuous pressing to a consistency of 6-60%, advantageously to a consistency of 10-40%, and more advantageously to 20-30%.

According to the invention after the continuous pressing consistency and/or fines content of the MFC suspension is measured by an on-line or off-line measurement device which measures consistency of the dried MFC or fines content of filtrate, and data received from the on-line or off-line measurement device's measurements are used to control operation parameters of the continuous pressing, for example to adjust pressing power, moment and/or rotational speed of the press and/or water removal amount and/or water removal rate. Specifically beneficial is to measure the consistency of the MFC suspension after pressing or the fines level of the filtrate to control the rotational speed of the continuous pressing to maximize end consistency after pressing and minimize the fines level of the filtrate.

According to an advantageous embodiment of the invention drying by the continuous pressing of the micro fibrillated cellulose (MFC) is provided by screw press pressing, in which the MFC suspension is transported through the pressing by a press screw of the screw press, which is surrounded by screen cylinders. After the MFC suspension has entered an inlet of the screw press, dewatering takes place immediately, first by gravity and with further transport of the MFC suspension towards an outlet of the screw press, the MFC suspension will be compressed more and more. The screw press technology as such is known to one skilled in the art in connection with dewatering pulp suspensions. Specifically, in drying by continuous pressing the MFC by screw pressing advantages are achieved, as the screw pressing technology is easily configured to provide continuous pressing but also offers advantages because of the low energy consumption and ease of operating and relatively high production rate.

According to an advantageous feature of the invention, the rotational speed of the screw press is in the range of 1-3 rpm.

According to an advantageous feature of the invention, the opening size of the screen cylinder is 0.2-0.5 mm.

According to an advantageous feature of the invention, in the screw pressing, based on the received measurement data of the consistency and/or fines content of the MFC suspension, the screw press speed and/or dilution degree is adjusted to control the continuous water removal by the continuous pressing.

According to an advantageous embodiment of the invention the drying by the continuous pressing of the micro fibrillated cellulose (MFC) is provided by twin wire pressing in which the MFC suspension is transported through the pressing between two wires, each forming a wire loop guided by guide and/or tension rolls, where the wire loops have a common run, i.e. a twin wire run, where the MFC suspension is guided between the two wires during this run, and in which at least one press roll is located inside one of the wire loop and a counter roll to the press roll is located opposite to the press roll inside the other wire loop. In between the press roll and the counter roll a pressing nip is formed for removing water from the MFC suspension. The twin wire press may comprise more than one press roll-counter roll pair and thus, more than one pressing nip along the twin wire run. The twin wire press technology as such is known to one skilled in the art from connection with bleaching process applications for mechanical and recycled fibrils. Specifically, in the drying by continuous pressing the MFC by the twin wire pressing, advantages are achieved, as the twin wire pressing technology is easily configured to provide continuous pressing.

According to an advantageous feature in the twin wire pressing, based on the received measurement data of the consistency and/or fines content of the MFC suspension, wire tension and/or nip pressure and/or dilution degree is adjusted to control the continuous water removal by the continuous pressing.

According to an advantageous embodiment of the invention the drying by the continuous pressing of the micro fibrillated cellulose (MFC) is provided by twin roll pressing in which MFC suspension is transported by a fabric through at least one pressing nip formed between two rolls—a press roll and its counter roll. The pressing nip is formed between the press roll and the counter roll for removing water from the MFC suspension. The twin roll press may comprise more than one press roll-counter roll pair and thus, more than one pressing nip. The twin roll press technology as such is known to one skilled in the art. Specifically, in drying by continuous pressing the MFC by the twin roll pressing, advantages are achieved, as the twin roll pressing technology is easily configured to provide continuous pressing but also advantages are achieved because higher consistency can be achieved more quickly because of the shorter residence time.

According to an advantageous feature of the invention, in the twin roll pressing, based on the received measurement data of the consistency and/or fines content of the MFC suspension, nip pressure and/or dilution degree is adjusted to control the continuous water removal by the continuous pressing.

According to an advantageous aspect in the system and in the method of producing micro fibrillated cellulose (MFC) filtrate from the continuous pressing is at least partially guided back to a previous stage of processing the MFC, for example to a pulping stage and/or to a refining stage and/or to a screening stage.

By the invention and its advantageous features several benefits are achieved: energy consumption of the drying by continuous pressing is low because it does not need evaporation or freezing of the material, which are very energy consuming and slow processes. Additionally, fast drying and a high production rate are achieved by the continuous pressing because it is a continuous process and thus it can be used to produce several tons of MFC material a day. Additionally, in connection with the invention the consistency of the MFC suspension can be accurately controlled. Additionally, the loss of fines is minimized as the filtrate of the continuous pressing is advantageously used in dilution of the MFC suspension in a previous process stage as any fines in the filtrate are then guided back to the process. Also, the invention enables economic and viable transportation of the MFC suspension as it is in high consistency after the continuous pressing.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

DESCRIPTION OF THE PREFERRED EMBODIMENTS

During the course of the following description like numbers and signs will be used to identify like elements according to the different views which illustrate the invention and its advantageous examples. In the figures some repetitive reference signs have been omitted for clarity reasons.

Figure 1:
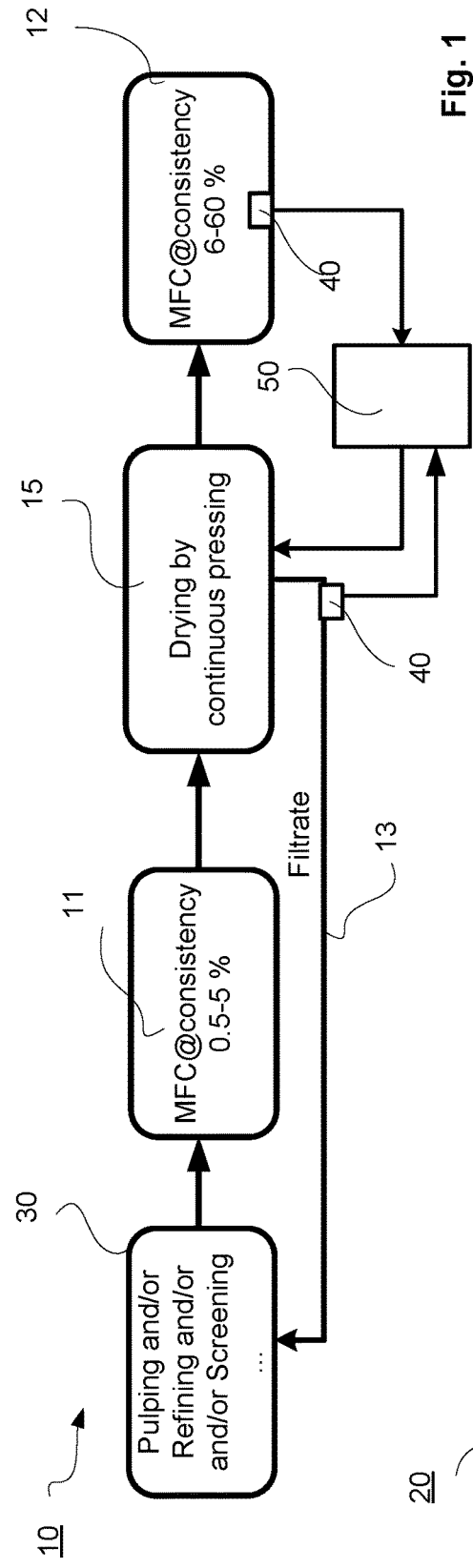
FIG. 1 is shown schematically as an example of the system and the method of producing micro fibrillated cellulose (MFC).

In FIG. 1 is shown schematically an example of the system and the method of producing Micro Fibrillated Cellulose (MFC). The system and the method 10 in this example comprises at least one process stage 30 by at least one process device 30, in which the MFC suspension is pulped in at least one pulping stage 30 in at least one pulper 30 and/or refined in at least one refining stage 30 by at least one refiner 30 and/or screened in at least one screening stage 30 by at least one screen 30. The system and the method 10 may also comprise other process stages 30 for processing the MFC suspension. In the system and in the method 10 in at least one stage 11 after at least one of the process stages 30, the MFC suspension has a consistency of 0.5-5%, at which stage 11 the MFC suspension is dried in at least one drying stage of continuous pressing 15 by at least one continuous pressing means 15 to a consistency of 6-60%, advantageously to a consistency of 10-40%, more advantageously to a consistency of 20-30%, for a dried MFC material in a ready stage 12.

Figure 2:
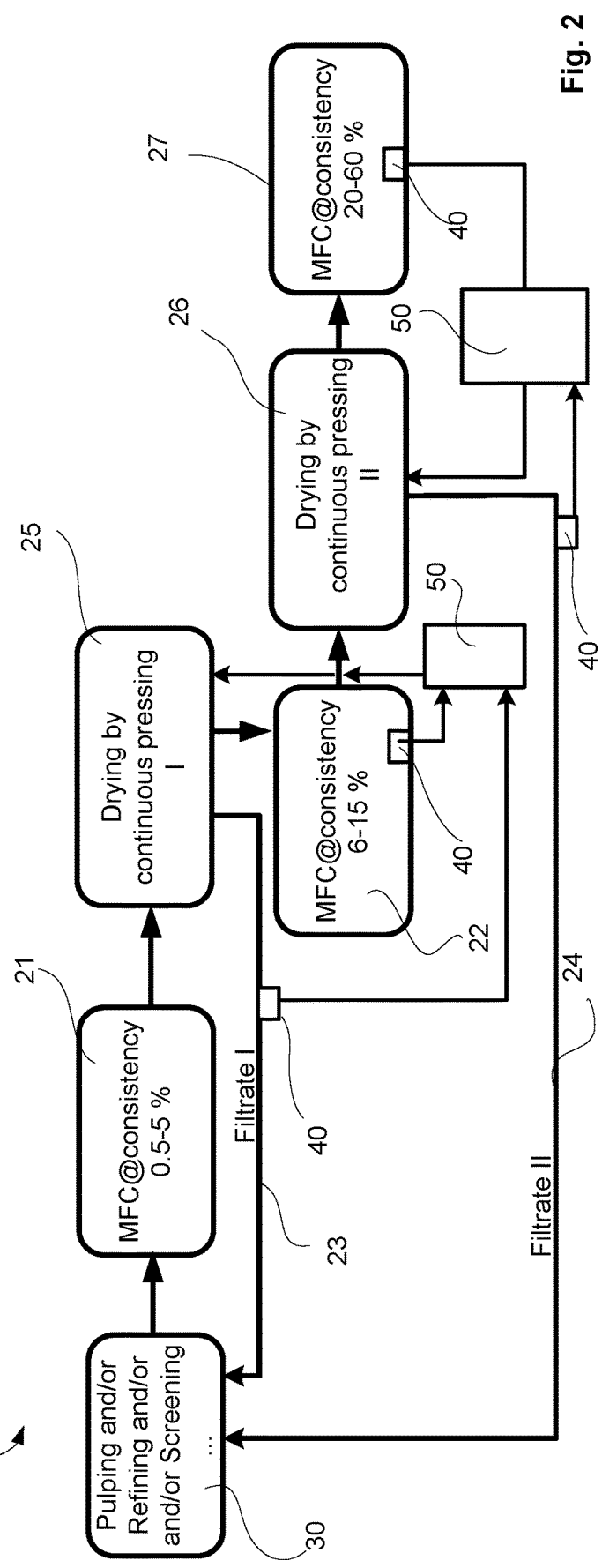
FIG. 2 is shown schematically as another example of the system and the method of producing micro fibrillated cellulose (MFC).

In FIG. 2 is shown schematically another example of the system and the method of producing micro fibrillated cellulose (MFC). The system and the method 20 in this example comprises at least one process stage 30 by at least one process device 30, in which the MFC suspension is pulped in at least one pulping stage 30 in at least one pulper 30 and/or refined in at least one refining stage 30 by at least one refiner 30 and/or screened in at least one screening stage 30 by at least one screen 30. The system and the method 10 may also comprise other process stages 30 for processing the MFC suspension. In the system and in the method 20 in at least one stage 21 after at least one of the process stages 30, the MFC suspension has a consistency of 0.5-5%, at which stage 21 the MFC suspension is dried in at least one first drying stage of continuous pressing stage 25 by at least one first continuous pressing means 25 to a consistency of 6-15%, at which stage 22 the MFC suspension is dried in at least one second drying stage of continuous pressing stage 26 by at least one second continuous pressing means 26 to a consistency of 20-60% for a dried MFC material in a ready stage 27.

In the examples of the FIGS. 1 and 2 after the drying stage of the continuous pressing 15, 25, 26 consistency and/or fines content of the MFC suspension is measured by on-line or off-line measurement means 40, for example by filtrate and/or dried MFC quality measurement means such, as fines levels and/or consistency, and the received measurement data is used to control operation parameters of the continuous pressing by a control means 50, for example by a computer controller or manually, for example to adjust pressing load and/or pressing speed and/or water removal amount and/or water removal rate and/or dilution degree in the continuous pressing stage 15, 26, 26.

In the examples of the FIGS. 1 and 2 the drying by the continuous pressing 15, 25, 26 of the micro fibrillated cellulose (MFC) is provided by screw press pressing by a screw press and/or twin wire pressing by a twin wire press and/or twin roll pressing by a twin roll press.

In the examples of the FIGS. 1 and 2 in the system and in the method 10, 20 of producing micro fibrillated cellulose (MFC), filtrate 13, 23, 24 from the drying stage of the continuous pressing 15, 25, 26 is at least partially guided back to one of the previous stages 30 of processing the MFC, for example to a pulping stage and/or to a refining stage and/or to a screening stage.

In the description in the foregoing, although some functions have been described with reference to certain features and examples, those functions may be performable by other features and examples whether described or not. Although features have been described with reference to the certain examples, those features may also be present in other examples whether described or not.

Above only some advantageous examples of the invention have been described to which examples the invention is not to be narrowly limited, and many modifications and alterations are possible within the invention.

We claim:

1. A system for producing Micro Fibrillated Cellulose (MFC) from a cellulose fiber suspension, the system comprising:
   at least one process device configured to process a MFC suspension to a consistency of 0.5-5%;
   at least one continuous pressing device configured to dry the MFC suspension to a consistency of 6-60%, wherein the continuous pressing device is a screw press having a speed;
   a measuring device arranged after the continuous pressing device and configured to measure the consistency of the MFC suspension; and
   a control device configured to control at least one operation parameter affecting the consistency of the MFC suspension based on the measured consistency of the MFC suspension, wherein the at least one operation parameter is screw press speed.

2. The system of claim 1 wherein the continuous pressing device forms a source of a filtrate, and further comprising:
   a measuring device configured to measure a fines content of the filtrate; and
   a control device configured to guide at least part of the filtrate back to the at least one process device.

3. The system of claim 1 wherein the at least one process device comprises a pulper.

4. The system of claim 1 wherein the at least one process device comprises a refiner.

5. The system of claim 1 wherein the at least one of process device comprises a screen.

6. A method of producing Micro Fibrillated Cellulose (MFC) from a cellulose fiber suspension, comprising the steps of:
   pulping an MFC suspension having a consistency of 0.5-5%;
   following pulping, refining the MFC suspension having the consistency of 0.5-5%;
   following the refining, screening the MFC suspension having the consistency of 0.5-5%;
   following the screening, dewatering the MFC suspension in a continuous pressing device to a consistency of 6-60%, wherein the continuous pressing device is a screw press having a speed, and wherein the continuous pressing device forms a source of filtrate, such that a filtrate is produced therefrom;
   following dewatering, measuring the MFC suspension consistency and measuring a fines content of the filtrate; and
   controlling the dewatering of the MFC suspension to a consistency of 6-60% by controlling the dewatering of the MFC suspension in the screw press by adjusting the screw press speed, and by controlling return of at least a part of the filtrate back to the pulping step, the refining step, or the screening step.

7. The method of claim 6 wherein the step of dewatering the MFC suspension to a consistency of 6-60% is controlled with the continuous pressing device, wherein the continuous pressing device is adjusted to increase or decrease dewatering based on the measuring the MFC suspension consistency following the step of dewatering.

* * * * *